Nov. 18, 1941.   A. C. GUNSAULUS ET AL   2,263,001
METHOD OF PRODUCING TIRE MOLDS
Filed Aug. 24, 1940
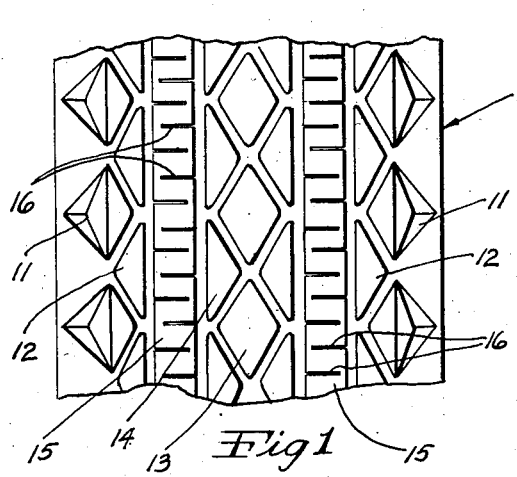
Fig.1
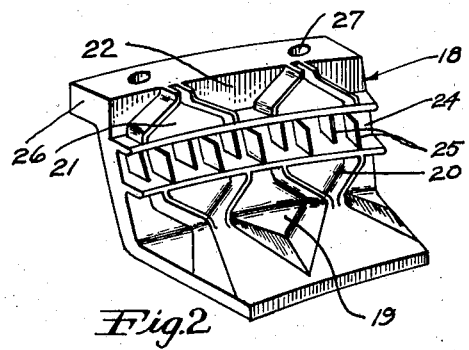
Fig.2
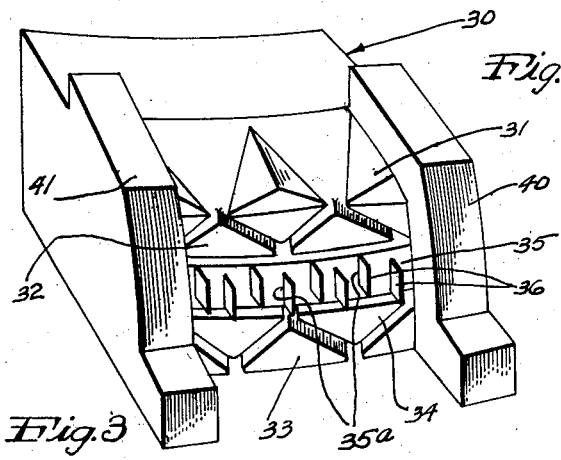
Fig.3
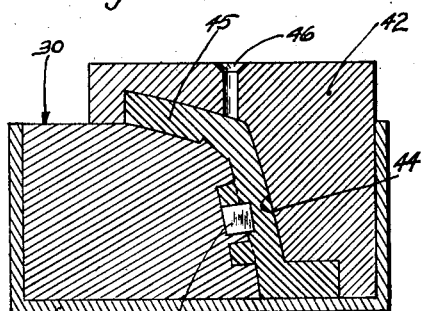
Fig.4
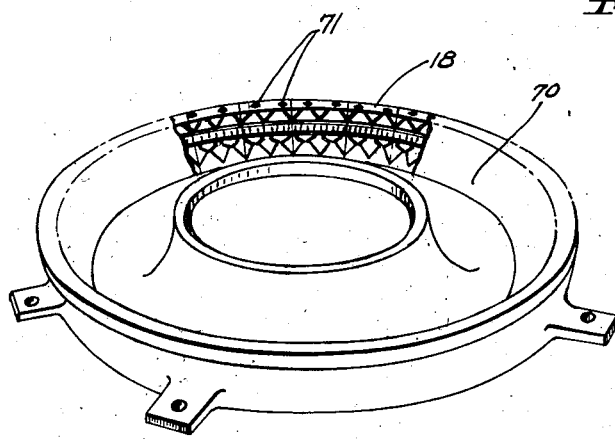
Fig.5
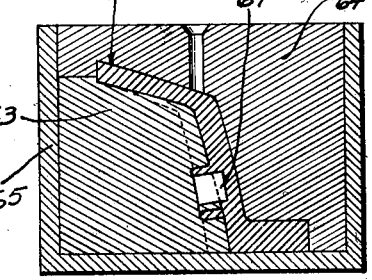
Fig.6
Fig.7
Inventor
Alfred C. Gunsaulus
and Morris Bean
By
Attorney Patented Nov. 18, 1941

2,263,001

UNITED STATES PATENT OFFICE 2,263,001

METHOD OF PRODUCING TIRE MOLDS

Alfred C. Gunsaulus, Akron, and Morris Bean, Yellow Springs, Ohio, assignors to Wingfoot Corporation, Wilmington, Del., a corporation of Delaware Application August 24, 1940, Serial No. 354,054

5 Claims. (Cl. 22—193)

This invention relates to improvements in vulcanizing molds and it refers more particularly to tire molds and methods of producing the same.

Prior to this invention, it has been customary to produce tires with molded rubber treads having grooves of substantial widths, i. e., wide enough so that the reverse mold projections which form such grooves could easily be produced by ordinary foundry practice. Recent trends in the designing have created a demand for extremely narrow grooves in tire treads, so narrow in fact that their counterparts have been incapable of formation by ordinary casting methods. These extremely narrow grooves have been formed in some tire treads by various means after the tire has been cured, as, for example, by gouging, grinding, cutting, or rasping, the instrumentalities used including electrically heated knives, grinding stones, circular saws, steel rasps etc. All such special equipment and their incident operations represent substantial production costs which are materially reduced, if not eliminated, by the present invention. Such grooves or slots are most efficient when formed quite narrow in proportion to their depth and we have found, by the application of this invention, that it is practical to mold these grooves in a tire tread so that they will have a width of from 0.01 to 0.04 of an inch. It is obvious that such thin ribs in a mold can not be cast by any ordinary or known foundry practice because the molten metal would not run into such narrow cavities and fill them before freezing off, and even if such thin ribs in a mold could be cast, they would not have sufficient strength to withstand the stresses they would be subjected to in a tire mold.

The method embodied in this invention is made possible and practical through the use of a plastic composition which is easily formed into the general outline of a tire when wet and when the composition has set and becomes solid, the configurations of the desired tire tread so carved and thin metal plates positioned in slots provided for them in the model with portions protruding above the surface in which they are inserted. From this model a pliable resilient pattern is formed in which narrow slots will appear in certain tread elements by the protruding plates in the model. Metal plates similar to the ones used in the model are inserted into the grooves in the pliable pattern from which a plaster core is formed and allowed to set. The pliable pattern is then removed and the thin metal plates will be transferred from the pliable pattern to the plaster core with that portion which fits in the grooves of the pattern now projecting from the plaster core. The core is then placed in a flask and molten metal poured around same, embedding the protruding portions of the thin metal plates in said molten metal and when the poured metal is sufficiently cooled, the plaster core is broken away, leaving those portions of the thin plates which were embedded in the plaster core projecting in the casting and intersecting certain cavities in the casting.

The various elements in this method of making a mold, when used in their proper sequence, will produce a mold with a minimum of effort, and the tire-tread-forming castings will be uniform and require no finishing, thus saving a substantial amount of time and labor.

An object of this invention is to provide a tread-forming portion of a mold that will form extremely narrow grooves in the tread of a tire during the regular vulcanizing process in an efficient and novel manner, by providing thin metal plates that will intersect, or partly so, certain depressions of the tread-forming portion of a mold, and which will provide uniformity as to spacing, depth and width of grooves, resulting in a more pleasing appearance in the finished product than can otherwise be obtained, and also eliminate the hazard of the tread tearing or breaking at the base of the slots.

An added advantage of this invention is that only one model and one pattern is required which may be used repeatedly and with proper care will last indefinitely. By the use of a pliable pattern, it is possible to transfer the thin metal plates from the pattern to the core which results in a substantial saving of time. This is made possible due to the lack of resistance of the pliable pattern to retain the thin plates when the core and pattern are separated, this transfer would be impossible were a solid pattern used and would ordinarily cause damage to one or both the core or the pattern, even though the greatest of caution were exercised.

These and other objects and advantages will be apparent from the following description and claims, when taken in connection with the accompanying drawing in which:

Figure 1 is a fragmentary plan view of a tire tread constructed in accordance with this invention;

Fig. 2 is a perspective view of a segmental tread-forming casting;

Fig. 3 is a perspective view of a plaster model;

Fig. 4 is a sectional view showing how the pattern is formed;

Fig. 5 is a perspective view of the pliable pattern;

Fig. 6 is a sectional view of a molding flask showing the tread-forming casting in the mold; and Fig. 7 is a perspective view showing one-half of a finished mold with the tread-forming castings in place.

In the drawing a tire tread as illustrated in Fig. 1 is designated generally by the numeral 10. The projections 11 and 12 form the side or shoulder portions and 13 and 14 form the central portion, the shoulder portions and central portions being separated by two circumferential ribs 15 having narrow slots or slits 16 formed in them in accordance with this invention.

In Fig. 2 a segmental thread-forming casting is designated generally by the numeral 18. It will be noted that the configuration of the casting is negative or reverse with respect to the tread design in Fig. 1, the depressions 19 and 20 corresponding to projections 11 and 12 of Fig. 1 and the depressions 21 and 22 corresponding to projections 13 and 14 and depression 24 corresponding to the circumferential ribs 15. The thin metal plates 25 have portions which are embedded in the casting, and the remaining portions projecting into the depression 24 for the purpose of forming the narrow grooves 16 in the ribs 15 of the tread 10. The tread-forming casting 18 may be composed of any suitable alloy (of bronze, aluminum or the like) and when molded in this manner only the sides need be finished. The flange 26 and holes 27 serve as a means for fastening the tread-forming castings into the outer steel shells of the tire mold.

The castings 18 with the plates 25 in their tread portions are made possible by a novel molding process, the method of which will now be described. Referring to Fig. 3, a plaster model 30 is first formed to the general contour of a portion of a tire tread, by means not shown, while in a plastic state with the shoulder portions 31 and 32, the central portions 33 and 34, and the circumferential ribs 35. Extremely narrow slots 35ᵃ are formed by carving after the plaster has set and dried in solid form, said narrow slots being of approximately the same depth as the height of the projecting rib projections 15 in Fig. 1, and thin metal plates 36 are inserted therein. The side flanges 40 and 41 are also formed on the model for the purpose of forming the sides of a cavity, and also furnish a support for the backing member 42 which, together with the model 30, form a mold in which a pliable elastic pattern is formed. When the model 30 has been completed with the thin metal plates 36 in place, the backing member 42 is positioned over the model 36 and both placed in a metal flask 43. When so positioned, a cavity 44 is formed and the pliable pattern 45 may be produced by pouring the molten material through the opening 46. The pattern is composed of a pliable, resilient material, such as polyvinylchloride, which becomes a liquid when heated but jells when cooled. We have found that a material bearing the trade-name of "Korogel," manufactured by the B. F. Goodrich Company of Akron, Ohio, serves the purpose admirably, although there are other materials that may be used.

Referring to Fig. 5, the pliable, resilient pattern indicated generally by the numeral 45, resembles the casting shown in Fig. 2 except that, instead of the thin plates 25, it is provided with grooves 50 which are formed by the plates 36 in the model 30 during the molding operation. The depressions 52 and 53 will form the shoulder portion of the core and depressions 54 and 55 will form the central portion, and the groove 56 the circumferential ribs. Thin metal plates 25 are positioned in the grooves 50 in the pliable elastic pattern 45 and the pattern, with suitable supporting parts, is placed in a flask in an arrangement like that shown in Fig. 4, thereby forming a cavity into which a liquid plaster is poured over the pattern to form a plaster core 63. When the core 63 has solidified it is taken from the flask and the pliable pattern 45 is removed. The thin metal plates will now be embedded in the plaster case, and, due to the pliability of the pattern 45, it can be removed from the case without the slightest injury to same. The core 63 will now have embedded therein the major portions of the steel plates 25, only those portions protruding therefrom which are to become embedded in the casting 18. When the pattern 45 has been removed from the core 63, the core may be dried and treated in any desired manner, as for example, in accordance with a process disclosed in a pending application filed by Morris Bean, June 16, 1936, Serial No. 87,086. During this treating process the metal plates may be removed to keep them clean or prevent damage to them, but this is not essential and they may remain in position if desired. All other parts of the mold formed of plaster are treated in the same manner.

When the core has been properly dried and treated, it is placed, together with a mating member 64, into a flask 65 (see Fig. 6) and molten metal poured through the opening 66. The molten metal will flow around the core 63 and the protruding portion 67 of the thin plates embedding said portions of the plates in the metal, and when the core 63 is removed those portions of the plates which have been embedded therein will appear protruding from certain cavities in the casting, as shown in Fig. 2.

After the castings have been cleaned they are fitted into the outer shells of the mold as will now be described. Tire molds are composed of two annular mating halves, being divided approximately around the circumferential center line. For illustration, we have shown one-half of a finished mold in Fig. 7. The outer shell 70 is formed with an annular depression and the tread-forming castings are fitted therein and held by the screws 71.

In recapitulation, it is pointed out that the steel plates are first blanked from suitable sheet metal (such as spring steel or stainless steel) with a punching die, a plaster model is produced and in which the various elements which form the tire tread are carved, some of the elevated elements being provided with slots into which the thin steel plates are inserted leaving portions protruding therefrom. A pliable pattern is then formed from the model in which slots will appear corresponding to the positions of the thin plates left protruding in the model. Thin plates are in turn set in the slots in the pliable pattern with portions protruding corresponding to the depths of the slots desired in the finished tire. A plaster core is then formed in the pliable pattern, and when the pattern is removed the thin plates will be transferred from the pattern and embedded in the plaster case with portions protruding corresponding to the portions which will be embedded in the casting. The plaster core is then dried and treated, after which it is placed in a mold and molten metal poured around same and over the projecting portions of the metal plates. After the metal has cooled the casting is taken from the mold and the plaster core removed, the thin metal plates being left embedded in the metal and becoming integral parts of the casting with those portions of the thin plates that were previously embedded in the plaster core projecting from the bottoms of certain cavities of the casting.

Although we have shown a mold in which segmental tread-forming castings are shown, it will be understood that the castings may be molded in full circle, or in one piece for each half of the mold, and it will also be understood that any type or design of slotted tread may be produced by this method. Many modifications as to the shape and position of the metal plates are possible, for instance the plates may be straight as shown or corrugated or curved, if desired, and they may be positioned at any angle desired that will suit the particular design of tread that is to be slotted, without departing from the spirit of the invention and the scope of the appended claims.

We claim:

1. The method of producing a tire vulcanizing mold which comprises forming a plaster model of the tire ultimately to be vulcanized, cutting relatively thin grooves in certain tread portions of said model, fitting and placing thin metallic plates in said grooves with a portion of each plate projecting beyond the tread surface of said model, casting a resilient pliable complemental pattern against the model, positioning thin metallic plates in the grooves which are formed in the resilient pattern by the projecting portions of the plates in said model, forming a plaster casting mold against the resilient pattern, said mold retaining the plates previously positioned in the resilient pattern, removing the plates from the grooves in the plaster core, inserting the final inserts in said grooves with portions of the inserts projecting, pouring molten metal around the core, thereby embedding the projecting portions of the inserts in the resulting metal casting, and removing the plaster core, thereby leaving the remaining portions of the inserts embedded in the metal casting to project from their proper places in the tread-forming portion of the mold.

2. The method of securing thin web-like inserts in the tread-forming portion of a tire mold, comprising forming a plaster model of the tire ultimately to be vulcanized, cutting narrow grooves in said model, positioning thin plates in said grooves with portions of said plates protruding beyond the surface of the plaster model, forming a pliable, resilient reverse pattern over said model in which grooves are formed by the protruding plates in the model, inserting plates in grooves in the pliable resilient pattern with portions of said plates protruding, forming a plaster core in the pliable, resilient pattern, removing the pliable resilient pattern from the plaster core leaving the thin plates embedded in the plaster core, removing said plates from the plaster core and substituting the final inserts in their places, pouring molten metal against the core to produce the tire-vulcanizing mold member, and in so doing surrounding the protruding portions of the plates with metal and permanently anchoring the same in the tread-forming portion of the tire mold, and breaking away the plaster core from the mold member so cast, leaving portions of the plates projecting from certain surfaces of the tread-forming portion of the mold casting.

3. In the method of producing tire molds, the steps of anchoring thin metallic blade inserts therein comprising forming a plaster positive model, carving narrow grooves at predetermined locations in said model, inserting thin plates in said grooves but leaving portions of same projecting above the surface of said model, forming a pliable, resilient negative pattern against said model, inserting metal plates in grooves in said resilient pattern, said grooves having been formed by the plates projecting from the positive model, forming a positive plaster core against said negative resilient pattern, inserting metal plates in grooves in said positive plaster core with portions of said plates projecting beyond some of the surfaces thereof, and pouring molten metal over said positive plaster core, thereby embedding the projecting portion of plates in the metal casting, the remaining portion projecting into the irregular tread-forming surface of the mold and becoming a part thereof.

4. The method of making a tire mold comprising forming a plaster model, making a pliable, resilient pattern from said model, forming a plaster core from said pliable, resilient pattern, embedding thin metal plates in said model with portions of same extending beyond surfaces thereof, forming a plaster core against the pliable resilient pattern, the plates being then partly embedded in the plaster core when the pattern is removed, placing the core in a flask and pouring molten metal against the core, thereby embedding the projecting portions of said plates in said molten metal, the remaining portions of the plates extending from the tread-forming surface of the casting and becoming parts thereof after the plaster core is removed therefrom.

5. In a tire mold the method of incorporating auxiliary inserts in the tread-forming inserts of an automobile tire mold, comprising forming an elastic negative pattern of the desired tire tread, placing thin blade inserts in slots in said pattern with certain portions projecting, forming a plaster core against said pattern whereby the thin blade inserts will be transferred from the resilient pattern into said plaster core with portions of such inserts protruding, placing the core in a mold and pouring molten metal around same whereby inserts are incorporated into the casting as and for the purpose described.

ALFRED C. GUNSAULUS.
MORRIS BEAN.